Feb. 28, 1933.  J. SNEED  1,899,644
FOUR-WHEEL BRAKE
Filed Feb. 2, 1924  2 Sheets-Sheet 2

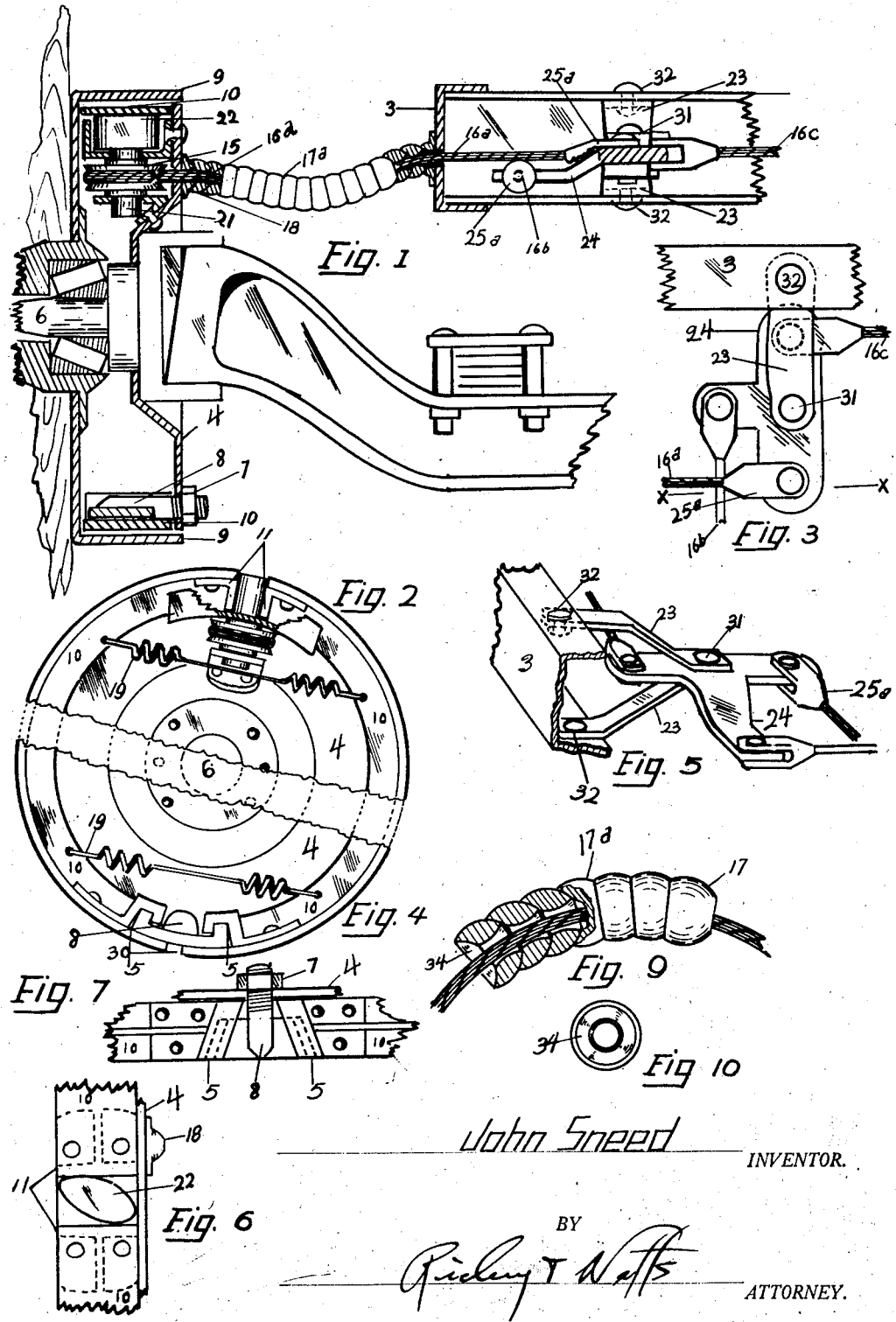

John Sneed INVENTOR.
BY
ATTORNEY.

Patented Feb. 28, 1933

1,899,644

UNITED STATES PATENT OFFICE

JOHN SNEED, OF KANSAS CITY, MISSOURI, ASSIGNOR TO STEELDRAULIC BRAKE CORPORATION, OF DETROIT, MICHIGAN, A CORPORATION OF MICHIGAN

FOUR-WHEEL BRAKE

Application filed February 2, 1924. Serial No. 690,123.

This invention relates to brake-actuating mechanism for vehicles, and more particularly to means for simultaneously applying braking power to the four wheels of an automobile.

Among the objects of my invention are the provision of means for applying equal braking pressure to all four wheels of a vehicle, or in predetermined ratio to the front and rear wheels respectively; the arrangement of simple and positive adjusting means whereby all brakes may be quickly and readily adjusted by a single adjustment; the mounting of the brakes on the front wheels so as to maintain equal braking pressure on both wheels regardless of their angular position; the arrangement of a flexible metallic conduit between the wheels and vehicle chassis for housing the operating cable without cramping or affecting the position of the cable when the steering wheels are turned, and the provision of a simple four-wheel brake actuating mechanism of few parts comparatively inexpensive to manufacture and readily assembled.

Other objects and advantages will be apparent from the following description, wherein reference is made to the accompanying drawings illustrating preferred embodiments of my invention and wherein similar reference numerals designate similar parts throughout the several views.

In the drawings:

Fig. 1 is a detail vertical section through the brake drum and adjacent parts of the front wheel of an automobile equipped with my improved braking mechanism.

Fig. 2 is a detail elevation of the upper portion of the brake shoes utilized within one of the brake drums.

Fig. 3 is a detail plan view of one of the multiple-armed levers for operating the cables whereby the brakes are applied.

Fig. 4 is an elevation of the lower part of the brake shoes utilized in one of the brake drums.

Fig. 5 is a detail perspective view of one of the multiple-armed levers, showing its mounting upon the vehicle chassis.

Fig. 6 is a detail plan view of the upper part of the brake shoes, showing the operating cam in the position assumed when the brake shoes are in operating position.

Fig. 7 is a detail bottom view of the lower portion of the brake shoes utilized in one of the brake drums.

Fig. 9 is a detail elevation, with parts in section of the flexible conduit utilized for housing the operating cable, and showing the positions assumed by the conduit sections when the conduit is bent.

Fig. 10 is an end elevation of one of the conduit sections.

Figure 8:
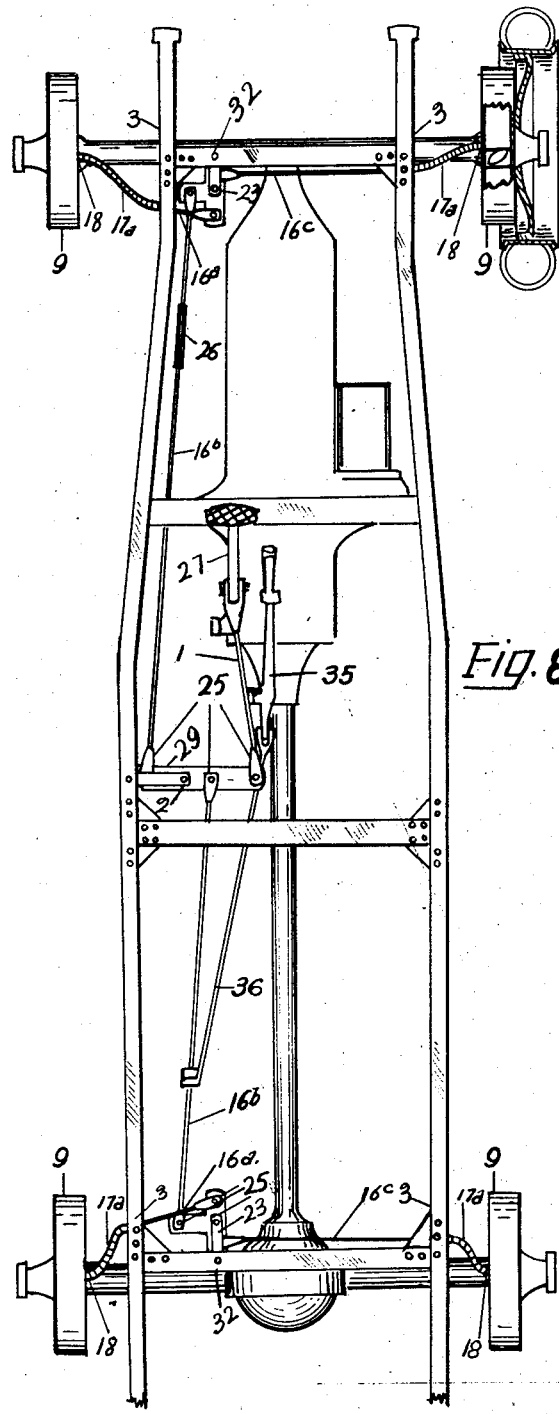
Fig. 8 is a plan view of my improved brake mechanism applied to the brake drums of four wheels on a skeleton chassis, parts being broken away and shown in section.

Referring now to the drawings, the numeral 3 designates a chassis of any desired size and contour, adapted to be equipped with four wheels of the usual or any desired type. Since the chassis and the wheels themselves form only an incidental relation to the claimed disclosure herein, no attempt has been made to illustrate or describe a completely operative driving or steering mechanism for the wheels, it being understood that the showing herein is only for purposes of exemplification of the manner of mounting the brake-actuating mechanism and the brakes themselves. A brake drum 9 is secured to each wheel in the usual or any desired manner and houses a pair of brake shoes 10 having depending lugs 11 adapted to be contacted by the operating cam 22 whereby the brake shoes will be separated at their upper extremities to engage the inner periphery of the brake drum whenever the brake-actuating mechanism is operated to set the brakes. As herein shown each brake shoe 10 is formed as a substantially semi-circular member fulcrumed at its lower extremity, as by having a grooved shoe 5 seating over inclined flanges formed on the wedge bolt 8 (note Figs. 4 and 7). The wedge bolt 8 is also utilized for adjusting the position of the brake shoes of each drum, the bolt extending through the inner cover plate 4 of the brake housing and meshing with a nut 7 adapted to engage the housing. By suitably rotating the nut 7 the position of the wedge bolt will be adjusted to separate or draw together the lower portions of the brake shoes. Coil springs 19 are arranged adjacent the upper and lower portions of the brake shoes to hold the shoes into engagement with the wedge bolt 8 and operating cam 22 (note Figs. 2 and 4). The operating cam 22 is formed with a shaft 21 journaled adjacent its lower extremity in a bracket carried by the brake housing 4 and carries a pulley 15 to the periphery of which is secured one extremity of a brake operating cable $16^a$ or $16^c$. The cable is arranged around the major portion of the periphery of the pulley so that a pull upon the cable will serve to rotate the pulley and cam 22 to expand the brake shoes. When the cable is again slackened by relaxation of such pull, the springs 19 serve to return the cam 22 and pulley 15 to their normal positions.

The mechanism for simultaneously turning the operating cams 22 of each brake drum will now be described. As best shown in Fig. 8, the brake pedal 27 is pivotally connected with the forward extremity of the pull rod 1, the rear extremity of which is pivoted to one arm of the central equalizing lever 29, which is pivoted intermediate its ends on a bracket 2 carried by the chassis. A pair of cables $16^b$ are pivotally connected to the equalizing lever 29 at predetermined distances from the fulcrum of said lever so as to move the two cables $16^b$ equal distances, or proportionate distances, whenever the equalizer lever 29 is rocked. The opposite extremities of the cables $16^b$ are pivotally connected with one arm of each of the multiple-armed equalizing levers 24 which are fulcrumed, as at 31, upon brackets 23 pivotally secured to the chassis, as by rivets 32. As best illustrated in Fig. 5 each multiple-armed equalizing lever 24 is also provided with a pair of arms to which the inner extremities of the cables $16^a$ and $16^c$ are pivotally connected with the lever 24 as by means of clevises $25^a$. Preferably the lever arm to which the cable $16^b$ is connected is curved to lie in a different plane from the lever arms to which the cables $16^a$ and $16^c$ are connected, whereby freedom of movement of the lever is readily secured. The points of attachment of the cables $16^a$ and $16^c$ to the multiple-armed equalizing lever 24 are equidistant from the fulcrum 31 of the lever, whereby exactly the same power will be imparted to the cables $16^a$ and $16^c$ whenever a pull is exerted upon the equalizer lever 24 through the cables $16^b$. The equalizer levers 24 are arranged adjacent the front and rear wheels so as to require comparatively short cables $16^a$ and $16^c$ while permitting the cables $16^b$ to be relatively long and extend in a straight line from the central lever 29 to the equalizing levers. The cables $16^b$ are preferably drawn taut after they have been connected to the levers 2 and 24, as by turnbuckles 26. Also, if desired, the emergency brake 35 may be connected with the brake operating mechanism, as by means of the rod 36 arranged between the emergency brake lever and one of the operating cables $16^b$ (note Fig. 8).

Each of the cables $16^a$ and $16^c$ pass through flexible conduits 17 arranged between the inner face plate of the housing 4 of the brake drum and adjacent portions of the chassis 3 (note Figs. 1 and 8). The construction of the conduits 17 is best illustrated in Fig. 9, and comprises a plurality of interfitting sections $17^a$ so arranged that the conduit may be flexed on a comparatively short radius without impairing the path of or exerting a binding action upon the cables passing therethrough. The outer surface adjacent one extremity of each section $17^a$ is curved to snugly fit into a socket 34 arranged in the adjacent surface of the next section, and then a second socket is arranged centrally of each section which is curved in a different direction from the surface of the sockets 34. This second socket is so disposed within the first socket 34 that when the several sections of the flexible conduit are bent, as shown in Fig. 9, the surfaces of the central sockets will present a series of spaced points for the cables to slide upon. Moreover, the curvature of the central sockets is such that during the flexing of the conduit the several sections will slide upon the cable without binding against or moving the cable. The end sections of each flexible conduit are provided with flanges for abutment against the surfaces of the face plate of the brake drum housing and the chassis respectively (note Fig. 1). Each cable $16^a$ and $16^c$ passes through an aperture in the face plate of the brake housing 4, which aperture is arranged substantially parallel with the periphery of the pulleys 15, whereby a straight line pull tangential to the pulley 15 will be secured whenever the levers 24 are rocked. Moreover, the shafts of the pulleys 15 and cams 22 are not set vertically over the spindles 6 of the wheels, but are offset sufficiently to permit the entrance of the cables through the face plate of the brake housing 4 to be vertically in line with the centers of the spindles 6, whereby the lateral turning of the front wheels is permitted without materially increasing the distances between the chassis and the points of entrance of the cables through the brake housings.

The length of the conduit 17 is preferably slightly greater than the longest distance possible between the points of entrance of the cables through the brake housing and the points of attachment of the conduit upon the chassis 3, whether such movement is by lateral turning of the front wheels or by vertical movement of the chassis with relation to the wheels when the springs of the vehicle are in motion. Accordingly, when the front wheels point straight ahead each flexible conduit must lie in a curved path between the points of attachment to the chassis and brake housing respectively, and when tension is applied to the cables 16ª or 16ᶜ the conduit members form arched thrust members through which the cables may slide while the conduits themselves remain flexible, permitting free lateral or vertical movement of the wheels without increasing or decreasing the amount of pull being applied to the cables themselves. It will be noted that the ball end of the conduit members is turned on the same radius as the socket end 34, so that when the conduit members are interfitted the conduit becomes substantially waterproof, excluding rain and maintaining lubricant adjacent the cables.

If the pedal 27 be depressed so that the front cables 16ª and 16ᶜ are moved, and the brakes applied a certain amount, and then, if the front wheels be turned, there will be no change in braking effect on either of the wheels because the amounts of cable housed within the conduits remain substantially constant regardless of changes in curvature of the conduits. However, if, while the wheels are turned, the brakes are applied, the conduit having the greater curvature will offer the greater frictional resistance to movement of the cable therein because the resultant effective lateral pressure between the cable and the conduit is a function of the curvature of the conduit. Thus when the steering wheels are turned and thereafter the brakes are applied, the brake actuated through the conduit having the greater curvature will be called upon for the lesser duty and the front equalizing device including the floating lever 24 will put upon the other brake with the straighter conduit a higher load. In other words, flexing the conduit neither binds nor tends to stretch the cable, but may vary the frictional resistance offered to it. When the conduit is in straight line the frictional loss beween it and the cable is negligible, but when the conduit is curved there exists a frictional resistance to movement of the cable depending upon the degree of curvature and upon the coefficient of friction between the cable and the conduit. Flexing the conduit does not move the cable neither does it increase or decrease the pull applied to the cables, but the conduit offers varying amounts of frictional resistance to movement of the cable therethrough according to the resultant lateral force exerted between the cable and the conduit, which force depends upon the load on the cable and conduit and on the amount or degree of curvature.

Thus, while equal forces are delivered through the multiple-armed lever 24 to the front cables 16ª and 16ᶜ, unequal spreading forces may be delivered to the right and left front brakes when the front wheels are turned because of the unequal frictional resistances offered by the conduits when in different positions of curvature. Because of the equalizer including the floating lever 24, equal pulls are delivered to the cables 16ª and 16ᶜ irrespective of the relative movements thereof with the result that unequal braking effects are achieved in the right and left front wheel brakes depending on relative frictional resistance offered by the right and left conduits to the cables therein. Without the equalizer this effect would be reduced and probably eliminated.

Figure 11:
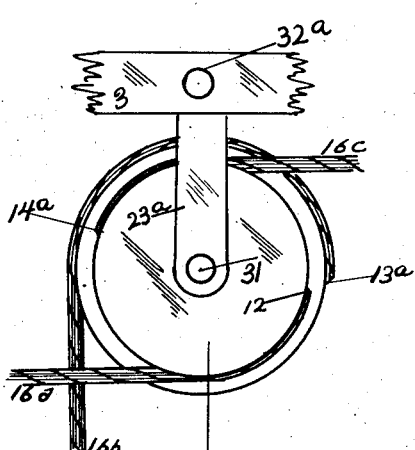
Fig. 11 is a plan view of a modified form of multiple-armed operating lever.
Figure 12:
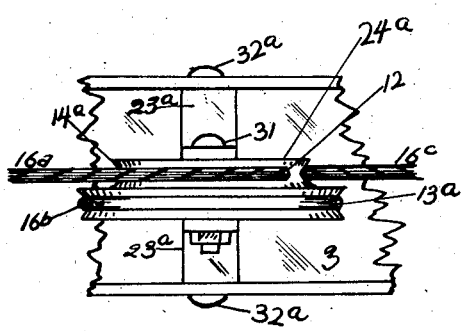
Fig. 12 is an end elevation thereof.

In Figs. 11 and 12 I have illustrated a modified form of multiple-armed equalizing levers 24ª, comprising superposed pulleys 13ª and 14ª of different diameters mounted on the same shaft 31ª journaled in the brackets 23ª secured to the chassis frame, as by rivets 32ª. The cables 16ª and 16ᶜ extend in opposite directions around portions of the periphery of the pulley 14ª and have their ends secured to the periphery of this pulley, whereby the oscillation of the pulley 14ª will serve to simultaneously exert a pull upon the cables 16ª and 16ᶜ, or will simultaneously relieve a pull upon such cables. The cable 16ᵇ encircles a portion of the periphery of the pulley 13ª, and its extremity is secured to the periphery of such pulley, whereby a pull exerted upon the cable 16ᵇ will serve to rock the pulley 13ª and the pulley 14ª to which the cables 16ª and 16ᶜ are secured.

The operation of my improved braking mechanism is believed to be apparent. When the brake pedal 27 is depressed, the central equalizer lever 2 is rocked to exert a pull upon both of the cables 16ᵇ to, in turn, rock the multiple-armed equalizer levers 24 to simultaneously exert a pulling action upon the cables 16ª and 16ᶜ connected with the pulleys 15 of the actuating cams 22 of each brake drum. This results in the partial rotation of the pulleys 15 and cams 22 to swing the cam and so expand the brake shoes 10 into engagement with the brake drums 9. As soon as the pressure on the brake pedal 27 is relieved, the springs 19 serve to restore the brake shoes 10 to their original position, returning the cams 22 to their normal inoperative position, while the usual spring connection to the brake pedal serves to exert a thrust upon the connecting rod 1 to restore the central equalizer lever 29, cables 16ᵇ and multiple-armed equalizing levers 24 to their normal inoperative positions. The return movement of the multiple-armed equalizing levers 24 exerts a pull upon each cable 16ª and 16ᶜ to take up any slack existing in these cables. Adjustment of the entire braking action can be made by changing the points of attachment of the cables 16ᵇ or connecting rod 1 upon the central equalizer lever 29, and adjustment of the braking effect upon both rear wheels or both front wheels may be made by changing the point of attachment of the cables 16b upon the multiple-armed equalizing levers 24. Similarly, the action exerted upon any individual brake drum can be adjusted by changing the point of attachment of its cable 16a or 16c upon its multiple-armed equalizing lever 24. Moreover, individual adjustment of the brake shoes in any drum may be made by proper movement of the wedge bolt 8, as hereinbefore, described.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

Having described my invention, I claim

1. In combination with the frame and wheels of a vehicle, a brake drum carried by each wheel, a pair of brake shoes mounted adjacent each drum, and means for simultaneously moving the brake shoes into braking positions including a brake pedal, a central equalizer lever connected with the brake pedal, a pair of cables pivoted upon the equalizer lever at predetermined distances from its fulcrum, multiple-armed levers floatingly fulcrumed adjacent the front and rear wheels and respectively connected with said cables, a pair of cables connected to each multiple-armed lever and extending to the adjacent wheels, and means engaging the brake shoes adapted to be actuated upon movement of the last mentioned cables.

2. In combination with the frame and wheels of a vehicle, a brake drum carried by each wheel, a pair of brake shoes mounted adjacent each drum, and means for simultaneously moving the brake shoes into braking positions including a brake pedal, a central equalizer lever connected with the brake pedal, a pair of cables pivoted upon the equalizer lever at predetermined distances from its fulcrum, multiple-armed levers floatingly fulcrumed adjacent the front and rear wheels and respectively connected with said cables, a pair of cables connected to each multiple-armed lever and extending to the adjacent wheels, and a cam engaging the brake shoes adapted to be actuated upon movement of the last mentioned cables.

3. In combination with the frame and wheels of a vehicle, a brake drum carried by each wheel, a pair of brake shoes mounted adjacent each drum, brackets pivotally mounted upon the frame adjacent the front and rear wheels respectively and means for simultaneously moving the brake shoes into braking positions including a pair of three-armed levers fulcrumed respectively upon said brackets adjacent the front and rear wheels, a pair of cables connected to two of the arms of each lever and respectively extending to the wheels adjacent each lever, means engaging the brake shoes and adapted to expand the brake shoes when a pull is exerted upon said cables, and means for simultaneously exerting a pull on said cables.

4. In combination with the frame and wheels of a vehicle, a brake drum carried by each wheel, a pair of brake shoes mounted adjacent each drum, brackets pivotally mounted upon the frame adjacent the front and rear wheels respectively and means for simultaneously moving the brake shoes into braking positions including a pair of three-armed levers fulcrumed respectively upon said brackets adjacent the front and rear wheels, a pair of cables connected to two of the arms of each lever and respectively extending to the wheels adjacent each lever, means engaging the brake shoes and adapted to expand the brake shoes when a pull is exerted upon said cables, and means for simultaneously exerting a pull on said cables, including an equalizer lever fulcrumed intermediate the three-armed levers, and cables connecting the equalizer lever with the respective three-armed levers.

5. In combination with the frame and wheels of a vehicle, a brake drum carried by each wheel, a brake shoe mounted adjacent each drum, brackets pivotally mounted upon the frame adjacent the front and rear wheels respectively and means for simultaneously moving the brake shoes into braking positions including a brake pedal, a central equalizer lever connected with the brake pedal, multiple-armed levers fulcrumed respectively upon the brackets adjacent the front and rear wheels, connections between the central equalizer lever and said multiple-armed levers, a pair of cables connected to each multiple-armed lever and extending to the adjacent wheels, a flexible conduit housing the portions of the cables exterior of the vehicle frame, and means engaging the brake shoes adapted to be actuated upon movement of the last cables.

6. In combination with the frame and wheels of a vehicle, a brake drum carried by each wheel, a pair of brake shoes mounted adjacent each drum, and means for simultaneously moving the brake shoes into braking positions including a central equalizer lever pivoted upon the frame, a brake pedal connected to said lever, a pair of cables pivoted upon the equalizer lever at predetermined distances from its fulcrum, an emergency brake lever secured to the frame and connected to one of said cables, multiple-armed substantially T-shaped levers fulcrumed adjacent the front and rear wheels and respectively connected with said cables, a pair of cables connected to each mutilple-armed lever and extending to the adjacent wheels, and means engaging the brake shoes adapted to be actuated upon movement of the emergency brake lever.

7. In combination with the frame and wheels of a vehicle, a brake drum carried by each wheel, a brake shoe mounted adjacent each drum, and means for simultaneously moving the brake shoe into braking position, including a central equalizer lever pivoted upon the frame, a brake pedal connected to said lever, a pair of cables pivoted upon the equalizer lever at predetermined distances from its fulcrum, an emergency brake lever secured to the frame and connected to one of said cables, multiple-armed substantially T-shaped levers fulcrumed adjacent the front and rear wheels and respectively connected with said cables, a pair of cables connected to each multiple-armed lever and extending to the adjacent wheels, and means engaging the brake shoes adapted to be actuated upon movement of the brake pedal or emergency brake lever.

8. In combination with the frame and wheels of a vehicle, a brake drum carried by each wheel, a brake shoe mounted adjacent each drum, and means for simultaneously moving the brake shoe into braking position, including a central equalizer lever pivoted upon the frame, a brake pedal connected to said lever, a pair of cables pivoted upon the equalizer lever at predetermined distances from its fulcrum, a multiple-armed substantially T-shaped lever fulcrumed adjacent the front and rear wheels and respectively connected with said cables, actuating means engaging the brake shoes, and a pair of cables connected to each multiple-armed lever and extending respectively to the actuating means of the adjacent wheels, all of said levers being pivoted upon the frame of the vehicle in normally horizontal positions.

9. In combination with the frame and wheels of a vehicle, a brake drum carried by each wheel, a brake shoe mounted adjacent each drum, and means for simultaneously moving the brake shoes into braking positions including a central equalizer lever pivoted on a vertically disposed fulcrum member carried by the frame, a pair of cables pivotally connected to the equalizer lever at predetermined distances from its fulcrum, a pair of multiple-armed levers pivoted on vertically disposed fulcrum members carried by the frame adjacent the front and rear wheels, respectively, each multiple-armed lever being connected to one of the cables extending from the equalizer lever, a pair of cables connected to each multiple-armed lever and extending radially to the adjacent wheels, and means engaging the brake shoes adapted to be actuated upon movement of the last mentioned cables.

10. In combination with the frame and wheels of a vehicle, a brake drum carried on each wheel upon its inner side, a brake housing arranged to substantially close the open side of each brake drum, retarding means mounted within each drum, and means for simultaneously moving the retarding means into braking position including cables extending through apertures in the frame and brake housing and operating said retarding means, and flexible conduits secured at their extremities to the frame and brake housings respectively and forming guides for the portions of said cables extending between the frame and brake housings.

11. The combination with the apertured frame and wheels of a vehicle, having a brake drum carried by each wheel and open at its inner side, an apertured brake housing substantially closing the inner side of each brake drum, retarding means mounted within each brake drum, and means for simultaneously actuating said retarding means including cables extending through the apertures in the frame and brake housings and connected with the retarding means, of flexible conduits arranged between the outer face of the frame and each vehicle housing to guide portions of said cables, the conduits being of a length greater than the distances between the frame and brake housings whereby the conduits will not lie in a straight line regardless of the positions assumed by the brake housings.

12. In a brake setting mechanism for applying brakes on the steering wheels of a vehicle, means producing a frictional resistance to said application said resistance varying with the steering angle of said wheels, said means being constructed and arranged in such a manner that the braking force reaching and becoming effective on said steering wheels decreases in proportion as said wheels are turned through a steering angle.

13. In a brake setting mechanism for applying brakes on the steering wheels of a vehicle, means producing a frictional resistance to said application said resistance varying with the steering angle of said wheels, and means included in said mechanism disposed between the point of initiation of said application and said first named means for balancing applications directed toward each wheel whereby the brake whose application encounters the greater frictional resistance takes the lesser braking load.

14. The combination of a vehicle having a frame and brakes associated with steering wheels, an actuating pedal, connections between said pedal and said brakes including cables, flexible conduits for housing said cables and disposed between said frame and each of said brakes, said conduits offering varying degrees of frictional resistance to the movement of the cable therethrough depending on their curvature and the steering angle of the wheels, and equalizing means included in said connections between said pedal and said cables, whereby the conduit offering the greater frictional resistance permits the lesser movement of its cable and restricts the duty on the brake with which it is connected.

In testimony whereof I affix my signature.

JOHN SNEED.